United States Patent
Brun et al.

(10) Patent No.: US 8,370,128 B2
(45) Date of Patent: Feb. 5, 2013

(54) SEMANTICALLY-DRIVEN EXTRACTION OF RELATIONS BETWEEN NAMED ENTITIES

(75) Inventors: Caroline Brun, Grenoble (FR); Caroline Hagege, Grenoble (FR)

(73) Assignee: Xerox Corporation, Norwalk, CT (US)

(*) Notice: Subject to any disclaimer, the term of this patent is extended or adjusted under 35 U.S.C. 154(b) by 973 days.

(21) Appl. No.: 12/241,347

(22) Filed: Sep. 30, 2008

(65) Prior Publication Data
US 2010/0082331 A1    Apr. 1, 2010

(51) Int. Cl.
*G06F 17/27* (2006.01)
(52) U.S. Cl. .......................... 704/9; 704/10
(58) Field of Classification Search ............. 704/9–10
See application file for complete search history.

(56) References Cited

U.S. PATENT DOCUMENTS

| | | | |
|---|---|---|---|
| 5,960,384 A * | 9/1999 | Brash ............... | 704/9 |
| 6,108,620 A * | 8/2000 | Richardson et al. ...... | 704/9 |
| 6,173,261 B1 * | 1/2001 | Arai et al. ............ | 704/257 |
| 6,263,335 B1 * | 7/2001 | Paik et al. ............ | 1/1 |
| 6,311,152 B1 | 10/2001 | Bai et al. | |
| 6,539,376 B1 * | 3/2003 | Sundaresan et al. ...... | 1/1 |
| 6,842,730 B1 * | 1/2005 | Ejerhed et al. ......... | 704/9 |
| 6,975,766 B2 | 12/2005 | Fukushima | |
| 6,983,240 B2 * | 1/2006 | Ait-Mokhtar et al. ..... | 704/9 |
| 7,058,567 B2 | 6/2006 | Aït-Mokhtar et al. | |
| 7,171,350 B2 | 1/2007 | Lin et al. | |
| 7,526,425 B2 * | 4/2009 | Marchisio et al. ....... | 704/9 |
| 2003/0208354 A1 * | 11/2003 | Lin et al. ............. | 704/9 |
| 2004/0078190 A1 * | 4/2004 | Fass et al. ............ | 704/7 |
| 2005/0071150 A1 * | 3/2005 | Nasypny ............... | 704/9 |
| 2006/0009966 A1 * | 1/2006 | Johnson et al. ......... | 704/10 |
| 2006/0047690 A1 * | 3/2006 | Humphreys et al. ....... | 707/102 |
| 2006/0282257 A1 * | 12/2006 | Huet et al. ........... | 704/9 |
| 2007/0005343 A1 * | 1/2007 | Sandor et al. .......... | 704/9 |
| 2007/0005344 A1 * | 1/2007 | Sandor et al. .......... | 704/9 |
| 2007/0055662 A1 * | 3/2007 | Edelman et al. ......... | 707/6 |
| 2007/0073533 A1 * | 3/2007 | Thione et al. .......... | 704/9 |
| 2007/0174041 A1 * | 7/2007 | Yeske ................. | 704/3 |
| 2007/0179776 A1 * | 8/2007 | Segond et al. .......... | 704/9 |
| 2007/0198600 A1 * | 8/2007 | Betz ................... | 707/201 |
| 2007/0219773 A1 * | 9/2007 | Roux et al. ............ | 704/1 |
| 2007/0233656 A1 * | 10/2007 | Bunescu et al. ......... | 707/3 |
| 2007/0282814 A1 * | 12/2007 | Gupta ................. | 707/3 |
| 2008/0294425 A1 * | 11/2008 | Hull et al. ............ | 704/9 |

(Continued)

FOREIGN PATENT DOCUMENTS
EP    1 814 047    8/2007

OTHER PUBLICATIONS
Bunescu et al. "Subsequence Kernels for Relation Extraction" 2006.*

(Continued)

*Primary Examiner* — Richemond Dorvil
*Assistant Examiner* — Greg Borsetti
(74) *Attorney, Agent, or Firm* — Fay Sharpe LLP

(57) ABSTRACT

A system and method of developing rules for text processing enable retrieval of instances of named entities in a predetermined semantic relation (such as the DATE and PLACE of an EVENT) by extracting patterns from text strings in which attested examples of named entities satisfying the semantic relation occur. The patterns are generalized to form rules which can be added to the existing rules of a syntactic parser and subsequently applied to text to find candidate instances of other named entities in the predetermined semantic relation.

20 Claims, 3 Drawing Sheets

U.S. PATENT DOCUMENTS

| | | | |
|---|---|---|---|
| 2009/0048830 A1* | 2/2009 | Roy | 704/235 |
| 2009/0100053 A1* | 4/2009 | Boschee et al. | 707/6 |
| 2010/0114561 A1* | 5/2010 | Yasin | 704/9 |
| 2010/0138216 A1* | 6/2010 | Tanev | 704/9 |
| 2010/0169299 A1* | 7/2010 | Pollara | 707/708 |

OTHER PUBLICATIONS

Yu. "Learning Syntax-Semantics Mappings to Bootstrap Word Learning" 2006.*
Ciravegna. "Adaptive Information Extraction from text by Rule Induction and Generalisation" 2001.*
Bunescu. "Learning for Information Extraction: From Named Entity Recognition and Disambiguation to Relation Extraction" Aug. 2007.*
Sandor et al. "Discourse and citation analysis with concept-matching" 2006.*
Banko et al. "The Tradeoffs Between Open and Traditional Relation Extraction" Jun. 16, 2008.*
Oles. "Precedence-inclusion patterns and relational learning" 2005.*
Chen et al. "Relation extraction using label propagation based semi-supervised learning" 2006.*
Huffman. "Learning information extraction patterns from examples" 1996.*
Yangarber et al. "Unsupervised discovery of scenario-level patterns for information extraction" 2000.*
Banko et al. "Open information extraction from the web" 2007.*
Brun et al. "Normalization and paraphrasing using symbolic methods" 2003.*
Jacquemin et al. "Enriching a text by semantic disambiguation for information extraction" 2005.*
Hagege "XRCE-T: XIP temporal module for TempEval campaign" Jun. 2007.*
Nadeau. "Semi-Supervised Named Entity Recognition: Learning to Recognize 100 Entity Types with Little Supervision" 2007.*
Brun et al. "XRCE-M: A Hybrid System for Named Entity Metonymy Resolution" Jun. 2007.*
Etzioni et al. "Unsupervised Named-Entity Extraction from the Web: An Experimental Study" 2005.*
Bach et al. "A Review of Relation Extraction" 2007.*
Agichtein, et al. "*Snowball*: Extracting Relations from Large Plain-Text Collections," Proceedings of the 5*th* ACM Conference on Digital Libraries, Jun. 2-7, 2000.
Auger, et al. "Pattern-based approaches to semantic relation extraction—A state-of-the-art," *Terminology*, vol. 14, No. 1, Jun. 25, 2008.
Brin, S. "Extracting Patterns and Relations from the World Wide Web," The World Wide Web and Databases Lecture Notes in *Computer Science*, vol. 1590, Jan. 1, 2006.
Xu, Fei-Yu. "Bootstrapping Relation Extraction from Semantic Seeds," Saarland University, 2007 (XP-002569147).
U.S. Appl. No. 11/846,740, filed Aug. 29, 2007, Brun, et al.
U.S. Appl. No. 12/028,126, filed Feb. 8, 2008, Brun, et al.
Aït-Mokhtar, et al., Incremental Finite-State Parsing, *Proceedings of Applied Natural Language Processing*, Washington, Apr. 1997.
Aït-Mokhtar, et al., Robustness Beyond Shallowness: Incremental Dependency Parsing, *Special Issue of NLE Journal*, 2002.
Aït-Mokhtar, et al., Subject and Object Dependency Extraction Using Finite-State Transducers, *Proceedings ACL'97 Workshop on Information Extraction and the Building of Lexical Semantic Resources for NLP Applications*, Madrid, Jul. 1997.
Brin, Extracting Patterns and Relations from the World Wide Web, *WebDB Workshop at EDBT'98*, 1998.
Brun, et al., Intertwining Deep Syntactic Processing and Named Entity Detection, *ESTAL2004*, Alicante, Spain, Oct. 20-22, 2004.
Hagège, et al., Entre Syntaxe et Sémantique: Normalisation de l'Analyse Syntaxique en vue de l'Amélioration de l'Extraction d'Information, *Proceedings TALN 2003*, Batz-sur-Mer, France, 2003.
Lee, et al., Fine-Grained Named Entity Recognition and Relation Extraction for Question Answering, *SIGIR*, 2007.
Specia, et al., A Hybrid Approach for Extracting Semantic Relations From Texts, *2nd Workshop on Ontology Learning and Population (OLP2) at COLING/ACL*, pp. 57-64, Sydney, Jul. 22, 2006.
Specia, et al., A Hybrid Approach for Relation Extraction Aimed to Semantic Annotation, *7th Flexible Query Answering Systems, FQAS-2006*, LNAI 4027, pp. 564-576. Milan, Jun. 7-10, 2006.
Specia, et al., *Relation Extraction for Semantic Intranet Annotation*,—technical report KMI Aug. 2006.
Stevenson, An Unsupervised WordNet-Based Algorithm for Relation Extraction, *In Proceedings of the "Beyond Named Entity" Workshop at the 4th Intl. Conference on Language Resources and Evaluation (LREC-04)*, pp. 37-42, Lisbon, Portugal, 2004.
Turney, Expressing Implicit Semantic Relations Without Supervision, *Proceedings of the 21st Intl. Conference on Computational Linguistics and 44th Annual Meeting of the ACL*, pp. 313-320, Sydney, Jul. 2006.
*The ACE 2007 Evaluation Plan. Evaluation of the Detection and Recognition of ACE. Entities, Values, Temporal Expressions, Relations and Event.* (previously available at: www.nist.gov/speech/test/ace/ace07/), Feb. 22, 2007.

* cited by examiner

SEMANTICALLY-DRIVEN EXTRACTION OF RELATIONS BETWEEN NAMED ENTITIES

CROSS REFERENCE TO RELATED PATENTS AND APPLICATIONS

The following references, the disclosures of which are incorporated herein in their entireties by reference, are mentioned:

Application Ser. No. 11/846,740, filed Aug. 29, 2007, entitled A HYBRID SYSTEM FOR NAMED ENTITY RESOLUTION, by Caroline Brun, et al.

Application Ser. No. 12/028,126, filed Feb. 8, 2008, entitled SEMANTIC COMPATIBILITY CHECKING FOR AUTOMATIC CORRECTION AND DISCOVERY OF NAMED ENTITIES, by Caroline Brun, et al.

BACKGROUND

The exemplary embodiment relates to text processing. It finds particular application in connection with a system and method for identifying lexico-syntactic patterns in text which can be expressed as rules for identifying two or more named entities in a specific semantic relationship.

A named entity is a group of one or more words (a text element) that identifies an entity by name. For example, named entities may include persons (such as a person's given name or role), organizations (such as the name of a corporation, institution, association, government or private organization), places (locations) (such as a country, state, town, geographic region, a named building, or the like), artifacts (such as names of consumer products, such as cars), temporal expressions, such as specific dates, events (which may be past, present, or future events, such as World War II; The 2012 Olympic Games), and monetary expressions. Named entities are typically capitalized in use to distinguish the named entity from an ordinary noun.

Named entities are of great interest for the task of information extraction in general, and for many other text processing applications. Identifying a group of words as a named entity can provide additional information about the sentence in which it is being used. Techniques for recognizing named entities in text typically rely on a lexicon which indexes entries that are named entities as such, and may further apply grammar rules, such as requiring capitalization, or use statistical analysis, to confirm that the group of words should be tagged as a named entity.

It is often desirable to identify two or more named entities in a particular semantic relationship. Extraction of semantic relations has many applications in information extraction, in particular fact extraction, question-answering, information retrieval, semantic network constructions, ontology building, and the like. For example, a user may wish to know when (i.e., seeking a DATE named entity) or where (a PLACE named entity) a particular event (an EVENT named entity) is to take place. Or, the user may wish to know who (a PERSON-NAME named entity) is the president of a particular company (an ORGANIZATION named entity). While a search could be performed for sentences which include the known named entity, a large number of sentences may be retrieved, most of which are not responsive to the semantic relationship which is the basis of the user's question. It has been proposed that certain regular patterns in word-usage can reflect underlying semantic relations. These patterns are referred herein as lexico-syntactic patterns. However, since there a large number of ways in which the semantic relation may be expressed in natural language text, it would be difficult and time consuming to establish lexico-syntactic patterns which a search engine could use reliably for identifying such semantic relations.

The exemplary embodiment provides a computer implemented system and method for automatically generating lexico-syntactic patterns, which can be used to extract semantic relations between named entities.

INCORPORATION BY REFERENCE

The following references are incorporated herein by reference in their entireties:

U.S. Pat. No. 7,058,567, entitled NATURAL LANGUAGE PARSER, by Aït-Mokhtar, et al. discloses a finite state parser which may be utilized in natural language processing.

U.S. Pub. No. 2007/0179776, by Segond, et al., discloses a system for retrieval of text which includes a processor which identifies grammar rules associated with text fragments of a text string that is retrieved from an associated storage medium, and retrieves text strings from the storage medium which satisfy the grammar rules. A user input device in communication with the processor enables a user to select text fragments of displayed text strings for generating a query. The processor identifies grammar rules associated with the user-selected text fragments and retrieves text strings from the storage medium which satisfy the grammar rules.

The following references relate generally to the identification of named entities in natural language text: U.S. Pat. No. 7,171,350, entitled METHOD FOR NAMED-ENTITY RECOGNITION AND VERIFICATION, by Lin, et al.; U.S. Pat. No. 6,975,766, entitled SYSTEM, METHOD AND PROGRAM FOR DISCRIMINATING NAMED ENTITY, by Fukushima; U.S. Pat. No. 6,311,152, entitled SYSTEM FOR CHINESE TOKENIZATION AND NAMED ENTITY RECOGNITION, by Bai, et al.

BRIEF DESCRIPTION

In accordance with one aspect of the exemplary embodiment, a method of developing rules for text processing includes identifying a semantic relation involving at least two named entities, each named entity being represented in the semantic relation by its class. A set of example instances of combinations of named entities which satisfy the semantic relation is provided. Text strings are retrieved from text, each of the retrieved strings including at least two of the named entities of one of the example instances in the set. From the retrieved text strings, syntactic patterns are extracted, each syntactic pattern involving at least two of the named entities of one of the example instances in the respective retrieved text string. Generalized rules are generated for text processing based on the extracted syntactic patterns, the rules being of a form for identifying candidate instances of the semantic relation in text.

In another aspect, a system for developing rules for text processing includes memory for storing a set of example instances of combinations of named entities which satisfy a semantic relation involving at least two named entities, wherein each named entity is represented in the semantic relation by its class. A text retriever retrieves text strings from text, each of the retrieved strings including at least two of the named entities of one of the example instances in the set. A pattern extractor extracts, from the retrieved text strings, syntactic patterns, each syntactic pattern involving at least two of the named entities of one of the example instances in the respective retrieved text string. A rules generator generates generalized rules for text processing based on the extracted syntactic patterns.

In another aspect, a method of identifying candidate instances of at least one of a date of an event and a place of an event, includes identifying attested instances of combinations of named entities which are the date and place of an event; retrieving text strings from text, each of the retrieved strings including at least two of the named entities of one of the attested instances; extracting, from the retrieved text strings, syntactic patterns, each syntactic pattern involving at least two of the named entities of one of the attested instances in the respective retrieved text string; generating generalized rules for text processing based on the extracted syntactic patterns; and applying the rules to text to identifying candidate instances of at least one of the date and the place of an event.

DETAILED DESCRIPTION

The exemplary embodiment relates to a system and method for automatically extracting lexico-syntactic patterns from a text corpus which are expected to reflect an underlying semantic relation involving selected named entities and deriving generalized rules therefrom, and to a computer program product encoding instructions for performing the method.

In general, text to be processed comprises one or more text strings expressed in a natural language having a vocabulary and a grammar. Each text string can be as short as a phrase or clause of a sentence and generally comprises a sentence, although it is also contemplated that a text string may comprise two or more contiguous sentences. An input text may be a document or set of documents (a corpus) which generally includes a plurality of text strings each comprising a plurality of text elements, such as words, phrases, numbers, and dates, or combinations thereof. In the case of input XML documents, the searchable text strings may include hidden text.

A "text element," as used herein, can comprise a word or group of words which together form a part of a generally longer text string, such as a sentence, in a natural language, such as English or French. In the case of ideographic languages, such as Japanese or Chinese, text elements may comprise one or more ideographic characters.

A "named entity" (NE) generally comprises a text element which identifies an entity by name and which belongs to a given class (semantic type). Named entities are generally nouns or noun phrases.

As used herein, a lexico-syntactic pattern (or simply "pattern") includes one or more regular relationships (dependencies) found between two (or more) text elements (usually words or short phrases) occurring together in a text string (such as a clause or full sentence) in a natural language, such as English or French. In the exemplary embodiment, for a pattern to be of interest, the text string includes text elements corresponding to two or more named entities which are instances of selected named entity classes and in each pattern, at least one and generally two of the named entities are present.

One object of the system and method is to automatically identify patterns (and from the patterns, rules) for retrieving text strings which reflect an underlying semantic relation between two (or more) named entity instances of selected named entity classes (or "semantic types"). For example, exemplary classes which may be selected from may include PERSON, EVENT, DATE, ORGANIZATION, PLACE, ARTIFACT, MONETARY EXPRESSION or may be more fine-grained classes, such as PERSON_NAME, PERSON_ROLE, ARTIFACT_WORK-OF-ART, EVENT_SPORTING, or even more specific classes, such as PERSON_NAME_AUTHOR, ARTIFACT_WORK-OF-ART_BOOK TITLE, etc., which are generally subclasses of one of the higher level classes. In general, the selection of classes may be limited by the level of refinement of whatever lexicon is used to identify named entities in text strings and tag them with named entity classes.

The semantic relation may include two or more of the classes, such as the tuple: DATE, PLACE, EVENT, as in the semantic relation DATE and PLACE of EVENT. However, it is also contemplated that the semantic relation may be among two named entities of the same class, such as PERSON_NAME, PERSON-NAME, as in the semantic relation: PERSON_NAME(X) is the mother of PERSON-NAME(Y).

Possible instances of a named entity class generally include all of the text elements which are labeled with a particular class in a given lexicon. For example, in the case of PLACE, they may include spatial, geographical, and physical locations, including planets, such as Earth, Mars, Jupiter, etc.; continents, such as Europe, North America, countries, such as England, France, etc., regions, states, or provinces, such as Ohio or Loire Valley, towns and cities, such as London, Paris, etc., or local districts, such as $14^{th}$ Arrondissement or Soho; or more specific locations, such as The White House, or Chateau de Versailles. In the case of the class DATE, named entities may include one or more of month, day of the month, year, day of the week, name of the day, and time of day. Example DATE instances may include: $19^{th}$ Century; 2009; April $1^{st}$; Friday $13^{th}$; Jan. 1, 2000; August 2008; New Year's Eve, and the like. Example EVENT named entities may include sporting events, cultural events, political events, celebrations, wars, named events relating to weather, and the like.

While the lexicon may class some named entities in more than one class, e.g., Vietnam may be a tagged as PLACE and EVENT, contextual analysis of a sentence may allow the ambiguity to be reduced or removed.

By way of example, consider the case of the semantic relation EVENT(X), PLACE(Y), DATE(Z) where X, Y, and Z are instances of classes EVENT, PLACE, and DATE, and the semantic relation specifies that Y and Z are the location and date of event X. A variety of patterns could express this one semantic relation, such as X will take place on Z at Y.

Y is the location for the X of Z.

In Z, the X was held in Y.

The exemplary embodiment provides an apparatus and method for finding examples of such patterns in a text corpus by selection of known instances of the named entities (e.g., triples or couples) for which retrieved text is likely to include a pattern which is an instance of the semantic relation. The patterns can then be used to identify more instances of the named entity classes in the semantic relation, allowing the exercise to be repeated to find even more patterns.

Figure 1:
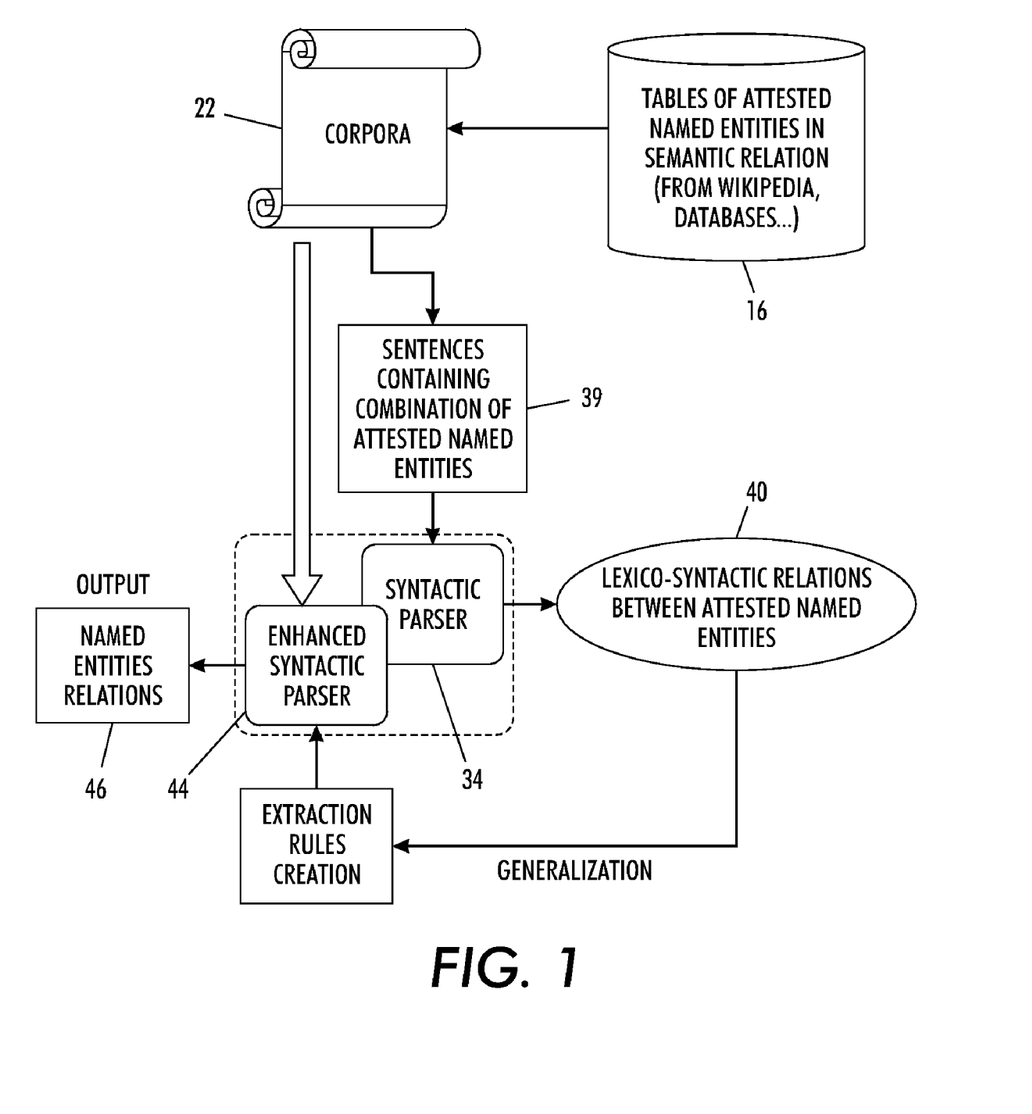
FIG. 1 is a functional representation of interactions between components of processing apparatus in accordance with one aspect of the exemplary embodiment.
Figure 2:
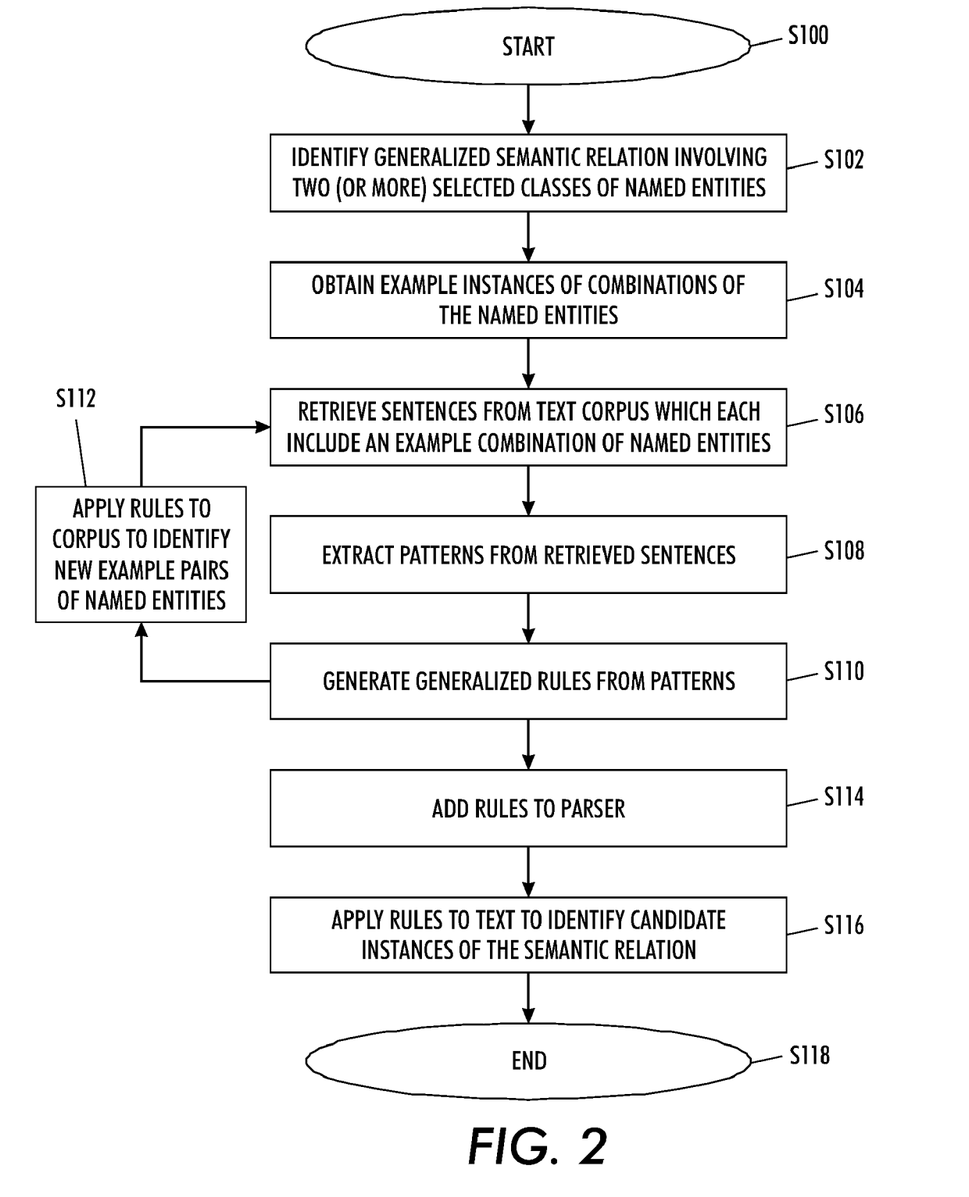
FIG. 2 is a flow chart which illustrates a method for extraction of syntactic patterns between named entities in accordance with one aspect of the exemplary embodiment.

FIG. 1 graphically illustrates aspects of the exemplary system and method which are described in further detail with reference to FIGS. 1 and 2. With reference to FIG. 2, the exemplary method proceeds as follows. The method begins at S100.

At S102, a generic semantic relation is defined. Let C1(X), C2(Y), etc. represent a tuple in which X represents a named entity in first class C1, and Y represents a named entity in a second class C2, etc. Let R{C1(X),C2(Y), etc} represent a semantic relation between the named entities X and Y.

In defining the relation, the classes are identified but not the specific instances of X, Y, etc. By way of example, in S102, the semantic relation: DATE-and-PLACE-of-EVENT(Z,X,Y) may be defined where X represents a named entity in the class DATE, Y represents a named entity in the class PLACE, and Z represents a named entity in the class EVENT. Other exemplary relations may include date(X) of event(Y); place (X) of event(Y); person(X) who is related (e.g., mother/father/brother/sister) to person(Y); person(X) who has role(Y) in organization (Z); company (X) that produces article (Y), etc.

At S104 a set of example instances of the tuple is developed. While in the exemplary embodiment, at least twenty example instances are provided from the knowledge base, fewer or more examples may be provided, such as 1, 2, 10, 20, 50, or more. Each example includes an instance of each named entity. These examples are attested (expected to be factually correct) and may be extracted from an external knowledge base, such as an online encyclopedia, optionally under manual supervision. For example, the dates and places of Olympic Games can be obtained from Wikipedia:

1896 Greece, Athens Olympic Games
1900 France, Paris Olympic Games
1904 United States, Saint-Louis Olympic Games
1908 United Kingdom, London Olympic Games
1912 Sweden, Stockholm Olympic Games
1916 Germany, Berlin Olympic Games
1920 Belgium, Antwerp Olympic Games
1924 France, Paris Olympic Games
1928 Netherlands, Amsterdam Olympic Games
1932 United States, Los Angeles Olympic Games
1936 Germany, Berlin Olympic Games
1940 Finland, Helsinki Olympic Games
1944 United Kingdom, London Olympic Games
1948 United Kingdom, London Olympic Games
1952 Finland, Helsinki Olympic Games
1960 Italy, Rome Olympic Games
1964 Japan, Tokyo Olympic Games
1968 Mexico, Mexico City Olympic Games
1972 Germany, Munich Olympic Games
1976 Canada, Montreal Olympic Games
1980 Soviet Union, Moscow Olympic Games
1984 United States, Los Angeles Olympic Games
1988 South Korea, Seoul Olympic Games
1992 Spain, Barcelona Olympic Games
1996 United States, Atlanta Olympic Games
2000 Australia, Sydney Olympic Games
2004 Greece, Athens Olympic Games
2008 China, Beijing Olympic Games
2012 United Kingdom, London Olympic Games At S106, a large corpus of text is searched for all instances of the examples of the tuple (such as the examples listed above). Specifically, a text string is retrieved from the corpus as an instance if each of the named entities of an example is present. The instances are extracted regardless of any lexico-syntactic patterns involving the named entities. As will be appreciated, the search can also be used for identifying examples of tuples which are subsets of the tuple, such as EVENT,DATE, or EVENT,PLACE, in the illustrated example. Where the named entity is a combination of two or more named entities, such as Barcelona and Spain for PLACE, the searches may accept either Barcelona or Spain or both as instances of the named entity. For example for 1992 Spain Barcelona Olympic Games, all sentences containing Spain/1992/Olympic Games, Barcelona/1992/Olympic Games, Spain/Olympic Games, Barcelona/Olympic Games, and 1992/Olympic Games are retrieved as instances. Each retrieved instance is tagged for further processing.

In the Olympic Games example, the following instances may be retrieved. For the tuple EVENT, PLACE, DATE:

The Sydney 2000 Olympic Games were the largest yet, with 10,651 athletes competing in 300 events.

The first measures against doping, however, were only taken after the Olympic Games in Helsinki in 1952.

In 2008, China welcomed the Olympic Games; the country is a permanent member of the United Nations Security Council.

For the tuple EVENT, PLACE:

The IOC has set objectives for fighting doping during the Olympic Games in Sydney.

For the tuple EVENT, DATE

It was only in 1928 that the decision was taken to authorize the participation of women in the Olympic Games.

As will be appreciated, many more instances may be retrieved than those illustrated, such as twenty or more or fifty or more. The actual number will depend on the size of the text corpus and the frequencies of the search terms used.

At S108, the retrieved text strings are processed to identify lexico-syntactic patterns involving the queried named entities. Specifically, the extracted sentences are used in order to automatically generate, using a syntactic parser, a set of dependencies from which lexico-syntactic patterns that link the named entities are automatically extracted.

At S110, rules are generated, based on the extracted patterns. The rules generalize the patterns, replacing the named entities with their corresponding classes and using normalized forms (lemmas) of other words.

At S112, optionally the generated rules may be reapplied to the text corpus to identify sentences which include examples of new tuples. These examples can be reapplied to the corpus as in S106 and S108, to identify further patterns and possibly additional rules.

At S114, the rules developed at S110 and S112 can be added to those of an existing syntactic parser to generate an enhanced syntactic parser. When applied to text, these rules are then able to identify candidate instances of the semantic relation, which are not limited to the example instances originally provided. By "candidate," it is meant that although the rule is satisfied, it cannot be certain that the text string is truly an instance of the semantic relation.

At S116, the rules can be re-applied on text in order to extract relations between named entities of the same type (e.g., EVENT/DATE/PLACE or PERSON/ROLE/ORGANIZATION), in a generic way.

For example, when the rules are applied to text which has not been used in generating the rules, such as:

The European Championship was organized in 2004 by Portugal

The system finds that one or more of the applicable rules is met and outputs the semantic relation:

DATE-and-PLACE-of-EVENT(2004, Portugal, European Championship)

The rules can be used for information extraction, e.g., in the case where a user wants to find the location of a specific event, for a specific year, and cannot readily identify the information in a resource, such as Wikipedia, or a simple keyword search retrieves too many documents in which the event and date selected occur, the rules can be applied by the syntactic parser on a text corpus to retrieve candidate instances, e.g., sentences which are more likely to express the semantic relation than without the added rules.

The method ends at S118.

Figure 3:
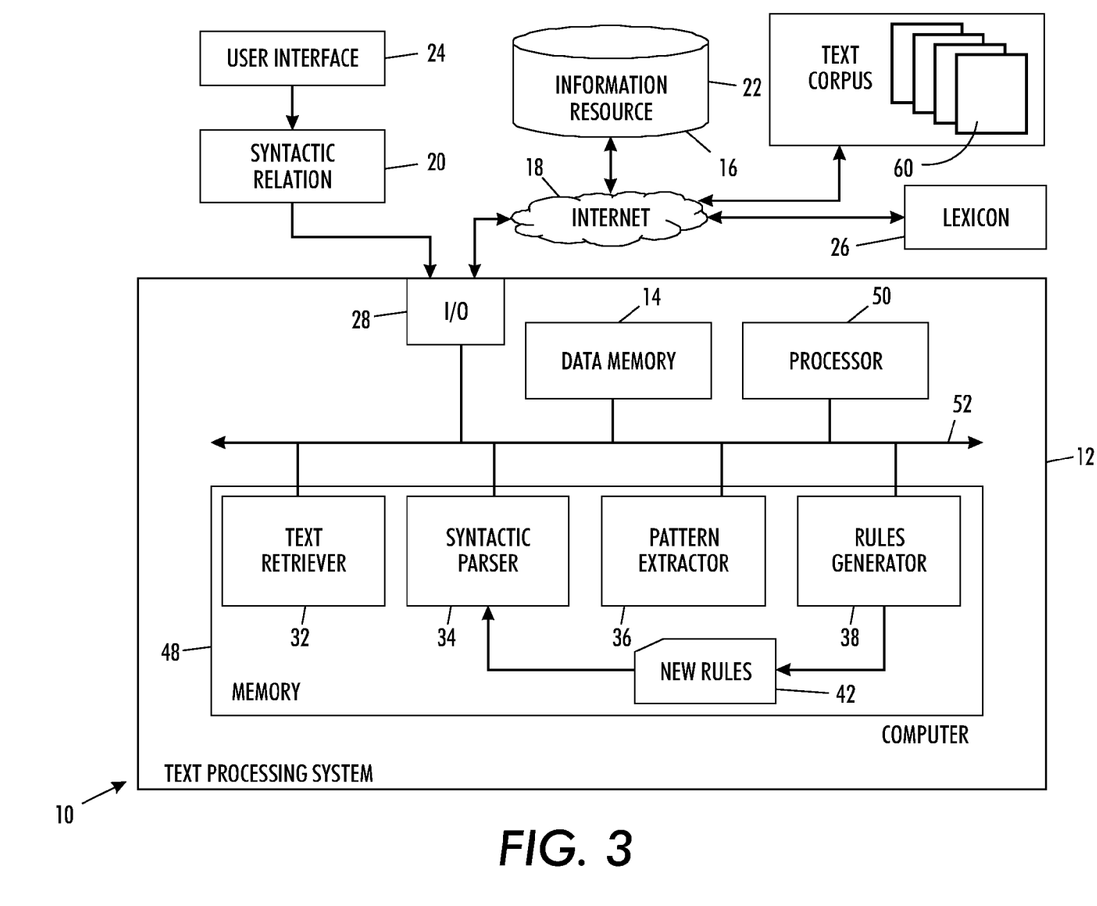
FIG. 3 is a functional block diagram of an apparatus for extraction of syntactic patterns between named entities in accordance with another aspect of the exemplary embodiment.

FIG. 3 illustrates an exemplary computer implemented text processing system 10, which may be used for performing the exemplary method. The system 10 may be hosted by one or more computing devices 12, such as a general purpose computer, e.g., a desktop or laptop computer, or a dedicated computer, such as a network server or web-based server. The system 10 includes data memory 14 for storing a set of factual examples of one or more tuples retrieved from a knowledge resource 16, such as an online database, which is accessible to the computer, e.g., via a wired or wireless connection, such as the Internet 18. As noted above, the tuples, which may be pairs, triples or other multiples, are named entity classes of a selected semantic relation 20, which may be input to the system 10 by a user. The semantic relation 20 defines two or more classes of named entities and the type of semantic relationship between them. The system 10 includes or has access to a text corpus 22, which may be stored in remote memory. A user interface 24, such as a keyboard, screen, or combination thereof, allows a user to select a semantic relation and verify tuple examples retrieved from the online resource 16. A lexicon 26 such as WordNet is accessible to the system. The lexicon lists named entities by class, which assists the system 10 in recognizing named entities in text and assigning named entity classes to the identified named entities. In the case of WordNet, this on-line resource can be used to identify a group of words as forming a named entity. This lexicon also indexes the entries according to one or more of a set of semantic types (or classes). Lower level types are grouped together under supertypes.

An input/output device 28 (or devices) allows data communication between the system 10 and the user interface 24 and external resources, such as the knowledge resource 16 and text corpus 20, e.g., via a wired or wireless link 18, such as a local area network or the Internet.

With continued reference to FIG. 3, and reference also to FIG. 1, the system 10 includes several text processing components 32, 34, 36, 38. These include a text retriever 32, which retrieves text strings, e.g., sentences 39, from the text corpus 22 that are instances of the tuple examples. A syntactic parser 34 parses the retrieved text strings. A pattern extractor 36, which may be incorporated in the parser 34 or separate therefrom, extracts lexico-syntactic patterns 40 which relate to the named entities in the retrieved text 39. A rules generator 38 generates generic rules 42, in the language of the parser 34 (e.g., python language), based on the extracted patterns, which rules can be added to the parser's existing rules to generate an enhanced syntactic parser 44.

In addition to utilizing the lexicon for identifying named entities, the parser 34 may include or access a classical named entity recognition system (NER). Such a system usually associates a predefined class to the identified entity, such as PERSON, PLACE, ORGANIZATION, DATES, etc. Automated name entity recognition systems which may be employed are described, for example, in U.S. Pat. Nos. 7,171,350; 6,975,766, and 6,311,152 and application Ser. Nos. 11/846,740 and 12/028,126, which are incorporated herein by reference in their entireties. Caroline Brun, Caroline Hagège, *Intertwining deep syntactic processing and named entity detection,* ESTAL 2004, Alicante, Spain, Oct. 20-22 (2004), provides another example of a NER system which is combined with a robust parser, which may be used herein as the parser 34.

The exemplary parser 34, now enhanced with the new rules as enhanced parser 44 operates on text (which may be the same or different from text 22, and outputs new named entity relations 46. Specifically, this allows semantic relations involving named entities to be detected in text strings. For example, given the sentence:

One could find many examples in the damage that has been carried out or planned on behalf of the organization of the Olympic Games of 2004 in Athens.

The system is able to extract a semantic relation between the event Olympic Games, the date 2004 and the place Athens, that could be, for example, DATE-and-PLACE-of-EVENT(2004, Athens, Olympic Games). Other events could, of course, be processed using the same rules.

The text processing components 32, 34, 36, 38 may be embodied in hardware, software, or a combination thereof. In the exemplary embodiment, the components include software instructions stored in the computer's main memory 48, which are executed by an associated processor 50, such as the computer's central processing unit (CPU). Components of the system 10 may be linked by a data control bus 52.

Memories 14 and 44, which may be separate or combined, may represent any type of computer readable medium such as random access memory (RAM), read only memory (ROM), magnetic disk or tape, optical disk, flash memory, or holographic memory. In one embodiment, the memory 14, 48 comprises a combination of random access memory and read only memory. In some embodiments, the processor and main memory 44 may be combined in a single chip.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method and system 10 may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 1, can be used to implement the method for text processing.

Further details of the system and method now follow.

The Syntactic Parser

The parser 34 generally takes as input text, such as one or more documents 60 in electronic form, each document including at least one text string, and transforms the input document(s) into annotated document(s). As used herein, the term "parser," generally refers to all of the annotation processing instructions which may be utilized in the annotation of the text string. The annotation preserves the inner grammatical structure of the text string, allowing for a fast search. In general, the parser 34 includes instructions for syntactically, semantically, and lexically analyzing the text content of the documents and identifying syntactic relationships (more generally, dependencies) between lexical units (words or groups of words) in the documents.

Annotated documents, in which named entity relations 46 are labeled, may be stored in a database, such as a relational database, where they can be queried with SQL language queries, or as an enriched XML file. The database can be located in any suitable storage medium, such as a disk, hard drive, Internet server, or the like. Along with XML, other structured formats that include structuring schema or other explicit organization can be used to provide a common structured document format for the annotated documents.

The exemplary parser 34 applies a set of rules for assigning tags to text. Specifically, for this application, the parser breaks down each of the retrieved text strings 39 containing instances of the selected tuples into a sequence of tokens, and applies finite state transducers to associate each word or token with lexical information, such as morpho-syntactic information, semantic information, and associated parts of speech. Based on these labels, the parser extracts dependencies involving the instances of the named entities in a given text string. From these dependencies, lexico-syntactic patterns are extracted, which may for example, combine the set of dependencies extracted from a text string which involve the example named entities.

Exemplary methods are developed from dependency grammars, as described, for example, in Mel'čuk I., "Dependency Syntax," State University of New York, Albany (1988) and in Tesnière L., "Elements de Syntaxe Structurale" (1959) Klincksiek Eds. (Corrected edition, Paris 1969). These rules can be adapted by adding a specific set of rules designed to identify syntactic dependencies between the named entity instances which can be used in the generation of patterns.

The parser 34 may be an incremental parser capable of performing robust and deep syntactic analysis, and can be adapted for processing the text. An exemplary parser which can be adapted to the identification of attributes is the Xerox Incremental Parser (XIP), as described, for example, in U.S. Pat. No. 7,058,567 to Aït-Mokhtar, incorporated herein by reference in its entirety, and in Aït-Mokhtar S., Chanod, J. P., Roux, C. "Robustness beyond Shallowness: Incremental Dependency Parsing," Special issue of NLE journal (2002) (hereinafter "Aït-Mokhtar 2002"); Aït-Mokhtar, et al. "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997.

As will be appreciated, rather than processing all the text, a dedicated system 10 may be employed which includes a more limited set of rules dedicated primarily to the exemplary methods disclosed herein.

In addition to extracting the syntactic dependencies that involve the named entity instances, the parser is also able to perform named entity recognition, in order to be able to generalize the patterns. For example, on the sentence below, a syntactic parser 34 could extract the following dependencies (syntactic relationships), involving the elements (date/place/event):

In 2008, China hosted the Olympic Games, and the country is a permanent member of the United Nations Security Council.
SUBJECT(hosted, China)
OBJECT(hosted, Olympic Games)
VERB-MODIFIER(hosted,2008)
EVENT(Olympic Games)
DATE(2008)
PLACE(China)

Generation of the Patterns (S108)

In S108, the set of output dependencies may be selected to represent one lexico-syntactic pattern 40, i.e. each dependency must be met for the pattern to be satisfied. In other embodiments, the pattern may be based on a subset of the output dependencies, such as only those that:

Involve one of the named entities in focus (here Olympic games as the event, 2008 as the date, and China as the place)

Involve only non-functional words (noun, verbs, adjectives and not prepositions or determiners, for example).

Thus, out of the six dependencies output by the parser in the above example, the extracted pattern 40 could be:
SUBJECT(hosted,China) &
OBJECT(hosted, Olympic Games) &
VERB-MODIFIER(hosted,2008)

Generalization of the Patterns and Generation of Rules Based on the Generalized Patterns (S110)

Step S110 of the method includes automatically generalizing the lexico-syntactic patterns 40 extracted in step S108, in order to build more generic lexico-syntactic rules 42. In the previous example, from the previous extracted dependencies, the following rule may be automatically induced, by generalization of the named entity types:
SUBJECT(host, PLACE(X)) & OBJECT(host,EVENT (Y)) & VERB-MODIFIER(host,DATE(Z))→DATE-and-PLACE-of-EVENT(Z,X,Y)

In generalizing the rule 42 from the pattern 40, normalized (lemma) forms of the non-named entity words may be used, such as the infinitive from of a verb (host in place of hosted) or the singular form of a plural word, if the parser has not already placed the words in this form. Once learned, these rules can be integrated in the syntactic parser set of rules, and applied as any other kind of rules on any corpora. For example, the rule can be expressed in the language understood by the parser.

Optionally, candidate instances 46 of the newly created DATE-and-PLACE-of-EVENT rule 42 can be retrieved from text and presented to a user for verification. If too large a proportion of the candidate instances are found not to be true instances of the semantic relation, the particular new rule may be considered as too unreliable to be added to the parser rules 34 and therefore eliminated.

The above-described system 10 and method find application in extraction of relations in information extraction, in particular fact extraction, question-answering, information retrieval, semantic network constructions, ontology building, and the like.

Without intending to limit the scope of the exemplary embodiment, the following example demonstrates the application of the method to a corpus of text documents in French.

EXAMPLE

A prototype text processing system 10 based on the Xerox Incremental Parser XIP (see, Salah Aït-Mokhtar, Jean-Pierre Chanod, Claude Roux, *Robustness beyond shallowness: incremental dependency parsing*, in a special issue of the NLE Journal, 2002), was used for this example.

As examples of tuples, a list of attested examples concerning the Olympic Games was extracted from Wikipedia (www.wikipedia.fr).

As a corpus 22, a French corpus of about 1.3 million sentences, provided by the European community about "acquis communautaires" (community assets) was used. This corpus was divided in two parts, one for extracting patterns 40, the other to be used for testing developed rules 42. On the first half, sentences that contain the triplets "Jeux Olympiques (Olympic games)/date/place" given by the Wikipedia attested list were extracted, and if the triplet was not present, then either of the couples "Jeux Olympiques/date" and "Jeux Olympiques/place" was extracted. From the initial corpus, 150 sentences 39 containing either a triplet or couple of attested entities were extracted.

These sentences were parsed with XIP 34, which provided a list of dependencies involving the attested entities.

This list of dependencies was automatically transformed using a python script developed for that purpose into a set of XIP rules 42. These new rules could be applied on top of the parser previously used. For example when parsing:

Londres organisera les Jeux Olympiques en 2012

(London will organize the Olympic Games in 2012)

XIP outputs the following dependencies:

SUBJ(organiser,Londres)
OBJ(organiser,Jeux Olympiques)
VMOD_POSIT1(organiser,2008)
PREPOBJ(2008,en)
DETERM_DEF_SPORT(Jeux Olympiques,le)
DATE(2008)
PLACE_TOWN(Londres)
EVENT_SPORT(Jeux Olympiques)

In the above formalism, each dependency appears on a separate line, the type of dependency identified by the parser is capitalized, and the word or words in that dependency follow in parenthesis. From this output all dependencies were selected that:

Involve one of the named entities from the selected classes (here EVENT, DATE, and PLACE); and Involve only non-functional words (noun, verbs, adjectives and not preposition or determiner for example).

So in this example, the selected dependencies are:

SUBJ(organiser,Londres)
OBJ(organiser,Jeux Olympiques)
VMOD_POSIT1(organiser,2008)
PLACE_TOWN(Londres)
DATE(2008)
EVENT_SPORT(jeux olympiques)

From this pattern, the named entity types are extracted, and consequently the following XIP rule can be deduced:

IF(SUBJ(#1[lemma:="organise"],#2) & PLACE(#2) & OBJ(#1,#3) & EVENT(#3) & VMOD(#1,#4) & DATE(#4)) DATE-and-PLACE-of-EVENT(#4,#2,#3)

In generating this new rule, the named entity subclasses (TOWN and SPORT) output by the parser are ignored, although in other embodiments, the named entities in the semantic relation of interest may be specified by class and subclass. This new rule could then be applied incrementally on top of the parser. When applying the enhanced parser integrating the new learned rules, for example, the following text string was extracted from the corpus (second half), for a different event:

Le Championnat d'Europe sera organisé en 2004 par le Portugal (The Championship of Europe will be organized in 2004 by Portugal)

SUBJ_PASSIVE(organiser,championnat d'Europe)
SUBJ(organiser,Portugal)
OBJ(organiser,championnat de Europe)
VMOD_POSIT1(organiser,2004)
NMOD_POSIT1(2004,Portugal)
AUXIL_PASSIVE(organiser,être)
DATE(2004)
PLACE_COUNTRY(Portugal)
EVENT_SPORT(championnat d'Europe)
DATE-and-PLACE-of-EVENT(2004, Portugal, championnat d'Europe)

As can be seen, the new rule applied by the parser extracts the above dependency DATE-AND-PLACE-of-EVENT which, in the parenthesis following, identifies the date as 2004, the place as Portugal, and the event as championnat d'Europe. Additionally, this example shows the benefit of applying deep syntax ("syntactic normalization"), as described in Caroline Hagège, Claude Roux, Entre syntaxe et sémantique: Normalisation de l'analyse syntaxique en vue de l'amélioration de l'extraction d'information. Proceedings TALN 2003, Batz-sur-Mer, France (2003)), which enables a mapping of active and passive cases.

An advantage of the exemplary method is that it does not rely on extracting subject-verb-object patterns. It therefore avoids the need to make a priori hypotheses of the type of syntactic dependencies that are likely to link the entities in the semantic relation of interest (typically, dates have verbal or nominal modifier functions). It can therefore account for examples like:

Les jeux olympiques de 1992 se déroulaient à Albertville.

(The Olympic Games of 1992 proceeded in Albertville.)

SUBJ(dérouler,jeux olympiques)
VMOD_POSIT1(dérouler,Albertville)
NMOD_POSIT1(jeux olympiques,1992)
PREPOBJ(Albertville,à)
PREPOBJ(1992,de)
DETERM_DEF(jeux olympiques,le)
REFLEX(dérouler,se)
DATE(1992)
PLACE_TOWN(Albertville)
EVENT_SPORT(jeux olympiques)
DATE-PLACE-EVENT(jeux olympiques,Albertville, 1992)
DATE-and-PLACE-of-EVENT(1992, Albertville, jeux olympiques)

Here, the entities of DATE and PLACE have modifier syntactic functions and do not follow the pattern subject-verb-object of the above-mentioned two previous examples.

On the 150 sentences about the Olympic Games that were extracted from the original corpus, about 60 XIP rules 42 were automatically built that were incrementally applied on top of the parser 34, in a new layer of rules.

To test these new rules developed by the system 10, the enhanced parser 44 was applied to the second half of the initial corpora 22. On this part of the corpora, a subset of the sentences (those that contained at least a named entity event extracted by XIP 34) were used. This subset consisted of about 1500 sentences. These sentences were annotated manually in terms of the relations (DATE-AND-PLACE-of-EVENT, DATE-of-EVENT, PLACE-of-EVENT) of which they were instances. The new rules were also applied to the 1500 sentences. The following results in TABLE 1 were obtained in terms of precision and recall.

TABLE 1

|  | DATE-and-PLACE-of-EVENT | DATE-of-EVENT | PLACE-of-EVENT | Average for all relations |
| --- | --- | --- | --- | --- |
| Precision | 90.3 | 90.9 | 92.9 | 92.3 |
| Recall | 49.1 | 80.0 | 83.7 | 77 |
| F-meas. | 63.6 | 85.1 | 88.1 | 83.9 |

Precision is the number of correct relations identified by the system 10 as a percentage of the number of relations identified by the system. Recall is the number of correct relations identified by the system expressed as a percentage of the total number of relations present in the corpus (1500 sentences). The F-measure is a weighted mean of the two values.

These results show that the system 10 achieves a very high precision, with an acceptable recall. Although recall is relatively low for the triplet relation, it is anticipated that it could be improved by generation of more triple-related rules by working on a larger corpus. Recall was higher for partial relations (date or place of event), suggesting that such an approach may be promising.

As discussed above in S112, one extension of the method would be to bootstrap on the results obtained on the whole corpus, using the new entities (e.g. date, event, and places) for which relations have been extracted, and thereby find other relations that link them. A manual validation could be employed, before using the new named entity tuples, to ensure that the new named entities found are effectively in the desired relation. If this were the case, the methodology could be re-applied using the "new" attested tuples of entities discovered in order to learn more combination of lexico-syntactic rules, on the same or on other corpora.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of developing rules for text processing comprising:
identifying a semantic relation involving at least two named entities, each named entity being represented in the semantic relation by its class;
providing a set of example instances, each example instance consisting of a combination of named entities which satisfy the semantic relation;
retrieving text strings from text, each of the retrieved strings including at least two of the named entities of one of the example instances in the set, the text strings being retrieved regardless of any lexico-syntactic relationship involving the named entities;
extracting, from the retrieved text strings, syntactic patterns, each syntactic pattern involving at least two of the named entities of one of the example instances in the respective retrieved text string;
generating generalized rules for text processing based on the extracted syntactic patterns, the rules being of a form for identifying candidate instances of the semantic relation in text; and
wherein the retrieving of text strings, extracting of syntactic patterns, and generating of rules are computer implemented.

2. The method of claim 1, wherein the extracting comprises parsing the retrieved text strings with a syntactic parser.

3. The method of claim 1, further comprising adding the generated rules to existing rules of a syntactic parser.

4. The method of claim 1, further comprising applying the generated rules to text to identify new example instances of named entities and repeating the retrieving, extracting, and generating steps using the new example instances.

5. The method of claim 1, wherein the classes are selected from the group consisting of PERSON, EVENT, DATE, ORGANIZATION, PLACE, ARTIFACT, and MONETARY EXPRESSION.

6. The method of claim 1, wherein the at least two named entities represented in the semantic relation are each represented by a different class.

7. The method of claim 6, wherein the classes are selected from DATE, PLACE, and EVENT and the semantic relation is selected from the group consisting of DATE-of-EVENT, PLACE-of-EVENT, DATE-and-PLACE-of EVENT.

8. The method of claim 1, wherein the providing of the set of example instances of named entities which satisfy the semantic relation include retrieving attested instances from a knowledge base.

9. The method of claim 1, wherein the extracting of each syntactic pattern includes identifying a set of dependencies, each of the dependencies involving at least one of the named entities of one of the example instances in the respective retrieved text string and combining at least some of the dependencies to form a pattern.

10. The method of claim 9, wherein the generating of the generalized rules includes replacing the named entity in each dependency with its corresponding class and optionally further includes normalizing other words in the dependencies.

11. The method of claim 1, wherein the generating of the generalized rules includes generating rules in the language of a syntactic parser configured for processing text.

12. The method of claim 1, further comprising applying the generated rules to text and labeling the text based on candidate instances of the semantic relation identified in the text.

13. The method of claim 1, further comprising using the new rules in information extraction to retrieve text which includes an instance of the semantic relation in response to an input of a selected named entity which is in one of the classes.

14. The method of claim 1, wherein the providing a set of example instances of combinations of named entities which satisfy the semantic relation comprises providing a set of example instances of a tuple consisting of the named entity classes, each example instance consisting only of an instance of each of the named entity classes in the tuple.

15. The method of claim 1, wherein the retrieving text strings from text, includes searching a corpus of text for instances of the example instances and retrieving all text strings from the corpus as an instance when each of the named entities of an example is present.

16. A computer program product comprising a non-transitory storage medium encoding instructions, which when executed on a computer provided with the example instances, causes the computer to perform the method of claim 1.

17. A system for developing rules for text processing comprising:
memory which stores instructions for performing the method of claim 1; and
a processor in communication with the memory which executes the instructions.

18. A system for developing rules for text processing comprising:
- memory for storing a set of example instances of combinations of named entities which satisfy a semantic relation involving at least two named entities, wherein each named entity is represented in the semantic relation by its class, each of the example instances consisting only of a named entity instance of each of the named entity classes in the combination;
- a text retriever for retrieving text strings from text by searching the text with the example instances, each of the retrieved strings including at least two of the named entities of one of the example instances in the set, the text strings being retrieved regardless of any lexico-syntactic relationship involving the named entities;
- a pattern extractor which extracts, from the retrieved text strings, syntactic patterns, each syntactic pattern involving at least two of the named entities of one of the example instances in the respective retrieved text string; and
- a rules generator which generates generalized rules for text processing based on the extracted syntactic patterns.

19. The system of claim 18, wherein the rules generator is configured for adding the generalized rules to the parser's existing rules.

20. A method of identifying candidate instances of at least one of a date of an event and a place of an event, comprising:
- identifying attested instances of combinations of named entities which are the date and place of an event, each of the instances consisting only of a DATE, PLACE, and EVENT tuple;
- searching for the attested instances and retrieving text strings from text, each of the retrieved strings including at least two of the named entities of one of the attested instances, the text strings being retrieved regardless of any lexico-syntactic relationship involving the named entities;
- extracting, from the retrieved text strings, syntactic patterns, each syntactic pattern involving at least two of the named entities of one of the attested instances in the respective retrieved text string;
- with a processor, generating generalized rules for text processing based on the extracted syntactic patterns; and
- applying the rules to text to identifying candidate instances of at least one of the date and the place of an event.

* * * * *